US012366351B2

(12) United States Patent
Huang et al.

(10) Patent No.: US 12,366,351 B2
(45) Date of Patent: Jul. 22, 2025

(54) ELECTRONIC DEVICE AND LIGHT CONTROL SYSTEM

(71) Applicant: CARUX TECHNOLOGY PTE. LTD., Singapore (SG)

(72) Inventors: Yu-Chia Huang, Miao-Li County (TW); Tsung-Han Tsai, Miao-Li County (TW)

(73) Assignee: CARUX TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 18/655,336

(22) Filed: May 6, 2024

(65) Prior Publication Data

US 2024/0401789 A1 Dec. 5, 2024

(30) Foreign Application Priority Data

May 30, 2023 (CN) ......................... 202310618921.3

(51) Int. Cl.
*F21V 23/04* (2006.01)

(52) U.S. Cl.
CPC ................................ *F21V 23/0464* (2013.01)

(58) Field of Classification Search
CPC .................................................. F21V 23/0464
See application file for complete search history.

(56) References Cited

U.S. PATENT DOCUMENTS

2002/0154379 A1* 10/2002 Tonar ...................... F21V 29/89 257/E33.059
2008/0129678 A1* 6/2008 Choi ....................... H04M 1/22 345/102
2012/0206050 A1* 8/2012 Spero ..................... B60Q 1/085 315/152
2013/0200806 A1* 8/2013 Chobot ............... F21V 23/0464 315/151
2014/0071659 A1* 3/2014 Huang ................... G02B 5/201 445/3
2015/0062509 A1* 3/2015 Huang .............. G02F 1/133617 349/106

FOREIGN PATENT DOCUMENTS

CN 103123782 A 5/2013

* cited by examiner

*Primary Examiner* — Tsion Tumebo
(74) *Attorney, Agent, or Firm* — JCIPRNET

(57) ABSTRACT

An electronic device includes a light emitting panel for emitting a first light ray and an optical film disposed on the light emitting panel. The first light ray has at least one corresponding position in a CIE 1931 color space. A modulated color point of the optical film has at least one corresponding position in the CIE 1931 color space. In the CIE 1931 color space, the at least one corresponding position of the first light ray has a first coordinate (x1, y1) corresponding thereto, the at least one corresponding position of the modulated color point has a second coordinate (x2, y2) corresponding thereto, and the first coordinate (x1, y1) and the second coordinate (x2, y2) satisfy certain relationships with respect to an equation of y(x)=−2.48x^2+2.52x−0.22.

20 Claims, 10 Drawing Sheets

ELECTRONIC DEVICE AND LIGHT CONTROL SYSTEM

BACKGROUND OF THE DISCLOSURE

1. Field of the Disclosure

The present disclosure relates to an electronic device and a light control system, and more particularly, to an electronic device and a light control system for adjusting color.

2. Description of the Prior Art

With the rapid development of science and technology, electronic devices equipped with light emitting devices or display devices have been widely used in daily life. However, the color of the light ray emitted by the electronic device may be affected by external factors. For example, a translucent decorative film disposed on the light emitting surface of the electronic device or other light rays in the environment where the electronic device is located may cause color distortion of the electronic device.

SUMMARY OF THE DISCLOSURE

According to an embodiment of the present disclosure, an electronic device includes a light emitting panel and an optical film. The light emitting panel is for emitting a first light ray. The first light ray has at least one corresponding position in a CIE 1931 color space. The optical film is disposed on the light emitting panel, and a modulated color point of the optical film has at least one corresponding position in the CIE 1931 color space. In the CIE 1931 color space, the at least one corresponding position of the first light ray has a first coordinate (x1, y1) corresponding thereto, the at least one corresponding position of the modulated color point has a second coordinate (x2, y2) corresponding thereto, and the first coordinate (x1, y1) and the second coordinate (x2, y2) satisfy following relationships with respect to an equation of $y(x)=-2.48x^2+2.52x-0.22$: when $(y1-y(x1))>0$, $(y2-y(x2))<0$, or when $(y1-y(x1))<0$, $(y2-y(x2))>0$; $0.1\leq x1\leq 0.6$; and $0.1\leq x2\leq 0.6$.

According to another embodiment of the present disclosure, a light control system includes a light emitting panel, a sensing unit and a control unit. The sensing unit is for sensing an ambient light ray in an environment. The ambient light ray has at least one corresponding position in a CIE 1931 color space. The control unit is electrically connected with the light emitting panel and the sensing unit. The control unit is configured to perform the following steps. A second coordinate (x2, y2) corresponding to the at least one corresponding position of the ambient light ray in the CIE 1931 color space is calculated. A first coordinate (x1, y1) is calculated based on the second coordinate (x2, y2) of the ambient light ray, in which the first coordinate (x1, y1) and the second coordinate (x2, y2) satisfy following relationship relative to an equation of $y(x)=-2.48x^2+2.52x-0.22$: when $(y1-y(x1))>0$, $(y2-y(x2))<0$, or when $(y1-y(x1))<0$, $(y2-y(x2))>0$. The light emitting panel is controlled to emit a first light ray, the first light ray has at least one corresponding position in the CIE 1931 color space, and the at least one corresponding position of the first light ray corresponds to the first coordinate (x1,y1) in the CIE 1931 color space.

These and other objectives of the present disclosure will no doubt become obvious to those of ordinary skill in the art after reading the following detailed description of the embodiment that is illustrated in the various figures and drawings.

DETAILED DESCRIPTION

Figure 1:
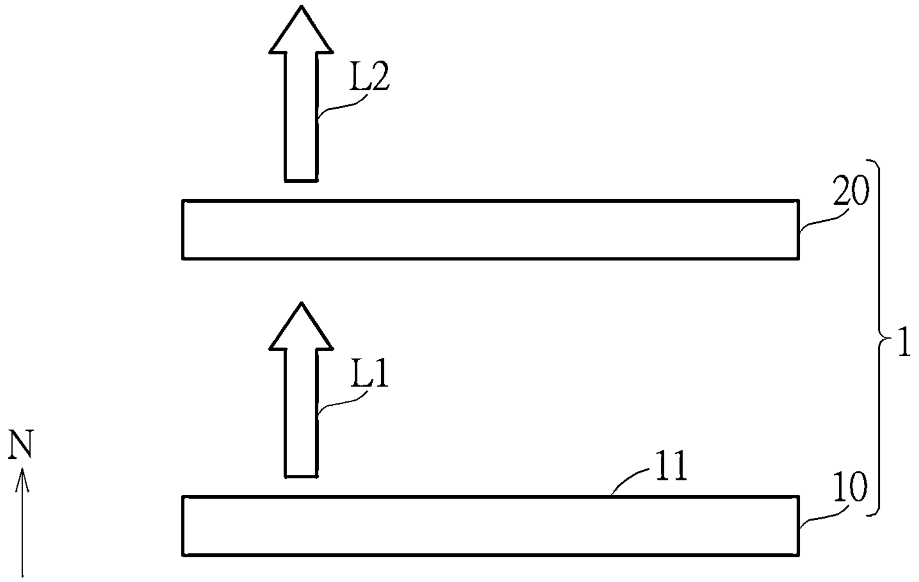
FIG. 1 is a schematic diagram showing a first light ray of a light emitting panel passing through an optical film according to an embodiment of the present disclosure.

The contents of the present disclosure will be described in detail with reference to specific embodiments and drawings. It is noted that, for purposes of illustrative clarity and being easily understood by the readers, the following drawings may be simplified schematic diagrams, and elements therein may not be drawn to scale. The numbers and sizes of the elements in the drawings are just illustrative and are not intended to limit the scope of the present disclosure.

Certain terms are used throughout the specification and the appended claims of the present disclosure to refer to specific elements. Those skilled in the art should understand that electronic equipment manufacturers may refer to an element by different names, and this document does not intend to distinguish between elements that differ in name but not function. In the following specification and claims, the terms "comprise", "include" and "have" are open-ended fashion, so they should be interpreted as "including but not limited to . . . ".

Although ordinal numbers such as "first", "second", etc., may be used to describe elements in the description and the claims, it does not imply and represent that there have other previous ordinal number. The ordinal numbers do not represent the order of the elements or the manufacturing order of the elements. The ordinal numbers are only used for discriminate an element with a certain designation from another element with the same designation. The claims and the description may not use the same terms. Accordingly, a first element in the description may be a second element in the claims.

In the present disclosure, the directional terms, such as "on/up/above", "down/below", "left", "right", "front", "rear/back", etc., are only directions referring to the drawings. Therefore, the directional terms are used for explaining and not used for limiting the present disclosure.

In the present disclosure, when an element or a layer is described as located on/above another element or another layer or described as connected with another element or another layer, it may refer that the element or the layer is directly located on/above the another element or the another layer or directly connected with the another element or the another layer, or there has further another element or further another layer disposed between the element or the layer and the another element or the another layer (i.e. the element or the layer is indirectly located on/above the another element or the another layer or indirectly connected with the another element or the another layer). However, when an element or a layer is described as directly located on/above another element or another layer or described as directly connected with another element or another layer, it should be understood that there is no further another element or further another layer disposed therebetween. Also, the term "electrically connected" or "coupled" includes means of direct or indirect electrical connection.

As disclosed herein, the terms "about", "substantially", "essentially", or "identical" generally mean within 20%, 10%, 5%, 3%, 2%, 1%, or 0.5% of the reported numerical value or range. The quantity disclosed herein is an approximate quantity, that is, without a specific description of "about", "substantially", "essentially", or "identical", the quantity may still include the meaning of "about", "substantially", "essentially", or "identical".

It should be understood that according to the following embodiments, features of different embodiments may be replaced, recombined or mixed to constitute other embodiments without departing from the spirit of the present disclosure. The features of various embodiments may be mixed arbitrarily and used in different embodiments without departing from the spirit of the present disclosure or conflicting.

Unless otherwise defined, all terms (including technical and scientific terms) used herein have the same meaning as commonly understood by those skilled in the art. It should be understood that these terms, such as those defined in commonly used dictionaries, should be interpreted as having meaning consistent with the relevant technology and the background or context of the present disclosure, and should not be interpreted in an idealized or excessively formal way, unless there is a specific definition in the embodiments of the present disclosure.

In the present disclosure, an electronic device may be bendable, stretchable, foldable, rollable, and/or flexible electronic device, but not limited thereto. The electronic device may include, for example, a light emitting device, a sensing device, a display device, an antenna device, a touch device, a tiled device, or other suitable electronic devices, but not limited thereto. The display device may, for example, be applied to a laptop, a public display, a tiled display, a vehicle display, a touch display, a television, a monitor, a smartphone, a tablet, a light source module, a lighting device or an electronic device applied to the above product, but not limited thereto. The sensing device may, for example, be a sensing device used for detecting change in capacitances, light, heat, or ultrasound, but not limited thereto. The sensing device may, for example, include a biosensor, a touch sensor, a fingerprint sensor, other suitable sensors or any combination of the sensors mentioned above. The display device may, for example, include a light emitting diode, a fluorescent material, a phosphor material, other suitable display mediums, or any combination thereof, but not limited thereto. The light emitting diode may, for example, include an organic light emitting diode (OLED), a mini light emitting diode (mini-LED), a micro light emitting diode (micro LED), a quantum dot light emitting diode (quantum dot LED), other suitable elements or any combination of elements mentioned above, but not limited thereto. The antenna device may, for example, include liquid crystal antenna, or antennas of other types, but not limited thereto. The tiled device may, for example, include a tiled display device or a tiled antenna device, but not limited thereto. Furthermore, the appearance of the electronic device may be rectangular, circular, polygonal, a shape with curved edges, curved or other suitable shapes. The electronic device may have peripheral systems such as a driving system, a control system, a light source system, a shelf system, etc. The electronic device may include electronic units, in which the electronic units may include a passive element and an active element, and for example include a capacitor, a resistor, an inductor, a diode, a transistor, a sensor, etc. It is noted that the electronic device of the present disclosure may be any combination of the above-mentioned devices, but not limited thereto.

Figure 2:
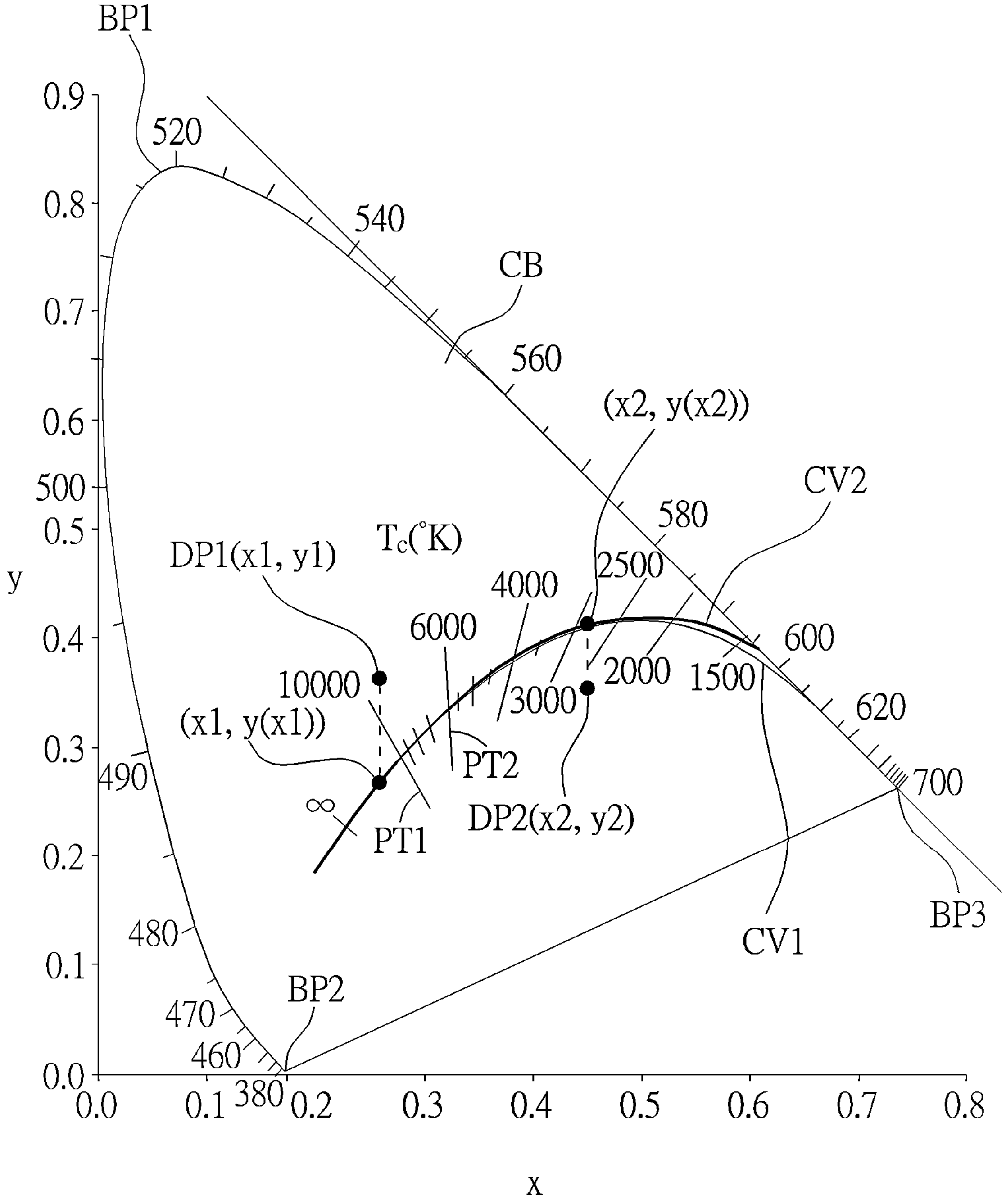
FIG. 2 is a schematic diagram showing positions of a first coordinate and a second coordinate in a chromaticity diagram of a CIE 1931 color space according to an embodiment of the present disclosure.

Please refer to FIG. 1 and FIG. 2. FIG. 1 is a schematic diagram showing a first light ray L1 of a light emitting panel 10 passing through an optical film 20 according to an embodiment of the present disclosure. FIG. 2 is a schematic diagram showing positions of a first coordinate (x1, y1) and a second coordinate (x2, y2) in a chromaticity diagram of a CIE 1931 color space according to an embodiment of the present disclosure. As shown in FIG. 1, an electronic device 1 is provided, which includes a light emitting panel 10 and an optical film 20. The optical film 20 is disposed on the light emitting panel 10. The light emitting panel 10 is for emitting a first light ray L1. The first light ray L has at least one corresponding position DP1 (see FIG. 2) in the CIE 1931 color space. A modulated color point (not labeled) of the optical film 20 has at least one corresponding position DP2 (see FIG. 2) in the CIE 1931 color space. In the CIE 1931 color space, the at least one corresponding position DP1 of the first light ray L1 has a first coordinate (x1, y1) corresponding thereto, the at least one corresponding position DP2 of the modulated color point has a second coordinate (x2, y2) corresponding thereto, and the first coordinate (x1, y1) and the second coordinate (x2, y2) satisfy following relationships with respect to an equation of $y(x)=-2.48x^2+2.52x-0.22$: when $(y1-y(x1))>0$, $(y2-y(x2))<0$, or when $(y1-y(x1))<0$, $(y2-y(x2))>0$; $0.1\leq x1\leq 0.6$; and $0.1\leq x2\leq 0.6$.

In FIG. 1, in order to illustrate the first light ray L1, a gap is shown between the light emitting panel 10 and the optical film 20. However, in actual situation, the light emitting panel 10 and the optical film 20 may be closely adjacent to each other from bottom to top, or only a small gap is therebetween, or the light emitting panel 10 and the optical film 20 may be connected with each other through an adhesive layer (such as the adhesive layer 30 in FIG. 8A), and the present disclosure is not limited thereto.

The electronic device 1, for example, may be a self-luminous type electronic device or a non-self-luminous type electronic device. When the electronic device 1 is a self-luminous type electronic device, the light emitting panel 10 may be, but is not limited to, a micro light emitting diode panel or an organic light emitting diode (OLED) panel. When the electronic device 1 is a non-self-luminous type electronic device, the light emitting panel 10 may be a liquid crystal panel, and the electronic device 1 may further include a backlight module (not shown). For details of the light emitting panel 10, reference may be made to the relevant descriptions of FIG. 8A and FIG. 8B.

The optical film 20 may be a transparent decorative film layer or a translucent decorative film layer, such as a film layer for decoration, and may optionally include colors, patterns, lines, other suitable patterns, or a combination thereof, but not limited thereto. The transparencies, colors, and patterns at different positions of the optical film 20 may be the same or different. Therefore, different regions of the optical film 20 may be regarded to have respectively corresponding modulated color points. Therefore, the optical film 20 has a set of modulated color points, and each of the modulated color points has one corresponding position or multiple corresponding positions in the CIE 1931 color space, such as the position DP2 in FIG. 2. In another embodiment, the modulated color point measured at the geometric center of the optical film 20 may also be regarded as the modulated color point of the optical film 20, but not limited thereto. In another embodiment, the average of the modulated color points measured at multiple positions of the optical film 20 may be calculated and may be regarded as the modulated color point of the optical film 20, but not limited thereto. The corresponding position or at least one of the multiple corresponding positions in the CIE 1931 color space of the aforementioned modulated color point has a second coordinate corresponding thereto, such as the second coordinate (x2, y2) in FIG. 2. The aforementioned modulated color point, for example, may be obtained by measuring the light transmission chromaticity coordinates of the aforementioned optical film 20 with a film layer color point measurement method. In the measurement method, a reference light source may be used to illuminate any position of the optical film 20. The reference light emitted by the reference light source has an intensity value at each wavelength, and thus a first spectral intensity distribution is formed. A penetrating light is emitted after the reference light passing through the optical film 20. The penetrating light has another intensity value at each wavelength, and thus a second spectral intensity distribution is formed. The second spectral intensity distribution of the penetrating light is divided by the first spectral intensity distribution of the reference light (that is, calculate the intensity ratio of the penetrating light to the reference light at the same wavelength from the shortest wavelength to the longest wavelength step by step) to obtain a third spectral intensity distribution. Afterward, the modulated color point of the optical film 20 is calculated based on the third spectral intensity distribution. For other details of the optical film 20, reference may be made to the relevant descriptions of FIG. 8A and FIG. 8B.

In FIG. 1, the light emitting panel 10 emits a first light ray L1, and a second light ray L2 is emitted after the first light ray L1 passes through the optical film 20. In other words, the first light ray L1 of the light emitting panel 10 is transformed into the second light ray L2 due to the influence of the modulated color point of the optical film 20. In the embodiment, the second light ray L2 is the light ray which is emitted by the light emitting panel 10 (such as the first light ray L1) and is modulated by the optical film 20 after passing through the optical film 20. That is, the second light ray L2 is the light ray emitted by the electronic device 1. The electronic device 1 has a normal direction N. The light emitting panel 10 has a light emitting surface 11. The normal direction N of the electronic device 1 is perpendicular to the light emitting surface 11 of the light emitting panel 10.

In FIG. 2, the chromaticity diagram of the CIE 1931 color space includes a color block CB which includes a shape similar to a horseshoe. In FIG. 2, only the outline of the color block CB is shown and the color of the color block CB is not shown. However, it should be known that the color block CB represents all the colors that can be seen by naked eyes. For example, the boundary point BP1 represents a greenish color, the boundary point BP2 represents a bluish color, and the boundary point BP3 represents a reddish color. The numbers around the color block CB range from 380 to 700 represent the wavelengths of visible light rays, and the units thereof are nanometers (nm). The curve CV1 represents a color temperature curve of a blackbody, which may also be called the absolute color temperature curve. Each of the short straight lines crossing the curve CV1 represents a set of points with the same color temperature. For example, the straight line PT1 represents the set of points with a color temperature of 10000 K, the straight line PT2 represents the set of points with a color temperature of 6000 K, and so on.

The curve CV2 represents the equation of $y(x)=-2.48x^2+2.52x-0.22$. The curve CV2 is obtained by simulating the curve CV1, but the present disclosure is not limited thereto. The first light ray L1 emitted by the light emitting panel 10 has a corresponding position DP1 in the CIE 1931 color space, and the position DP1 has a first coordinate (x1, y1) in the CIE 1931 color space corresponding thereto. The modulated color point of the optical film 20 has a corresponding position DP2 in the CIE 1931 color space, and the position DP2 has a second coordinate (x2, y2) in the CIE 1931 color space corresponding thereto. When the x-coordinate of the curve CV2 is x1, the y-coordinate is y(x1), and when the x-coordinate of curve CV2 is x2, the y-coordinate is y(x2). In FIG. 2, the following relationships are satisfied: $y(x1)<y1$, and $y(x2)>y2$, that is, $(y1-y(x1))>0$, and $(y2-y(x2))<0$, which is exemplary. In other embodiment, the following relationships may be satisfied: $y(x1)>y1$, $y(x2)<y2$, that is, $(y1-y(x1))<0$, and $(y2-y(x2))>0$. Thereby, one of the first coordinate (x1, y1) and the second coordinate (x2, y2) is located above the curve CV2, and the other one of the first coordinate (x1, y1) and the second coordinate (x2, y2) is located below the curve CV2, so that the color of the first light ray L1 and the color of the modulated color point may be coordinated with each other to allow the color of the light ray, such as the second light ray L2 in FIG. 1, emitted by the electronic device 1, can meet requirements, such as improving the problem of color distortion or providing a color temperature range that is more comfortable for human eyes.

Figure 3:
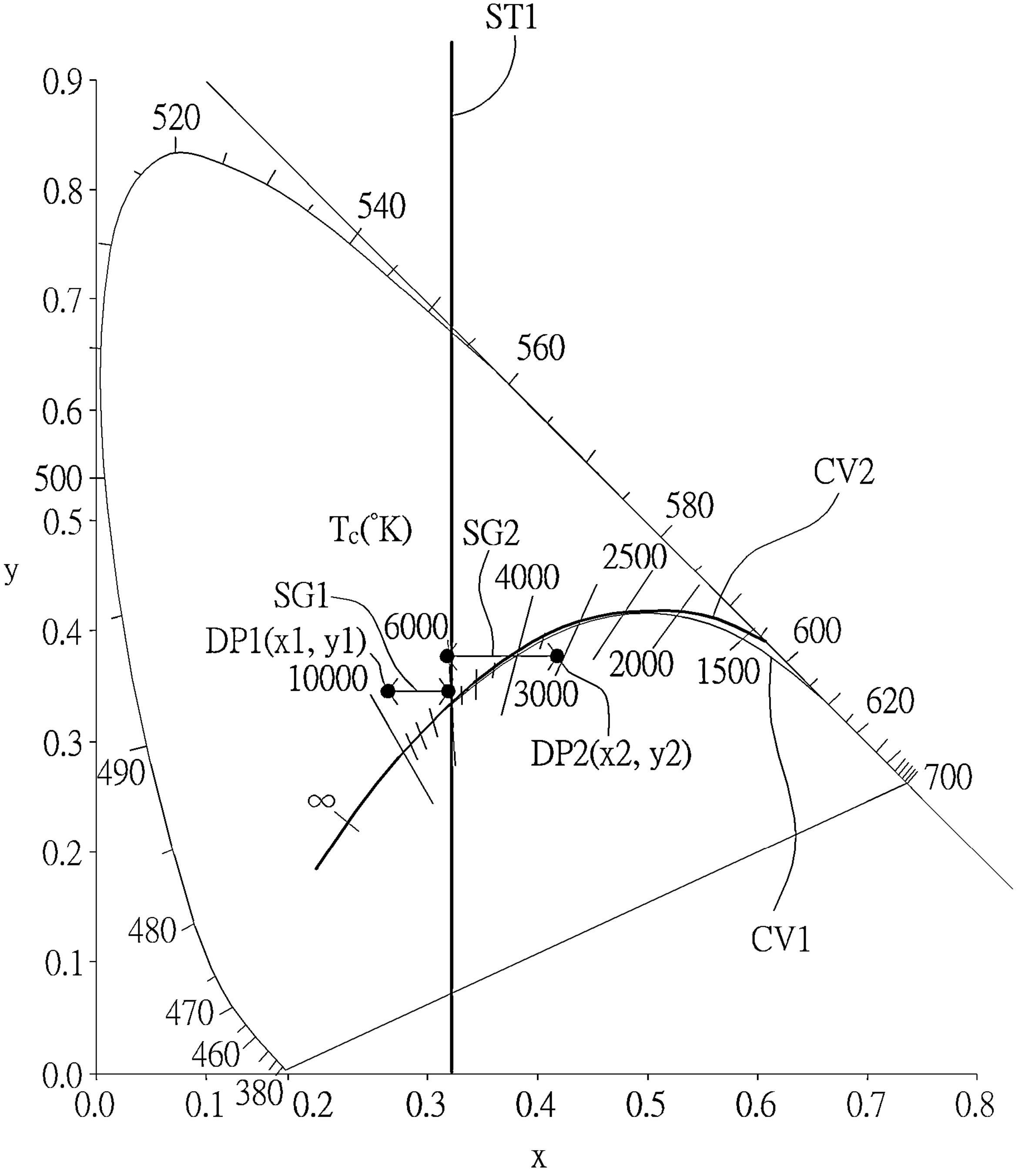
FIG. 3 is a schematic diagram showing positions of a first coordinate and a second coordinate in the chromaticity diagram of the CIE 1931 color space according to another embodiment of the present disclosure.

Please refer to FIG. 3, which is a schematic diagram showing positions of a first coordinate (x1,y1) and a second coordinate (x2,y2) in the chromaticity diagram of the CIE 1931 color space according to another embodiment of the present disclosure. The straight line ST1 represents the equation of $x=W_x$, in which the following relationship is satisfied: $0.25 \le W_x \le 0.35$. In FIG. 3, the following relationships are satisfied: $x1<W_x$, and $x2>W_x$, that is, $(W_x-x1)>0$, and $(W_x-x2)<0$, which is exemplary. In other embodiments, the following relationships may be satisfied: $x1>W_x$, $x2<W_x$, that is, $(W_x-x1)<0$, and $(W_x-x2)>0$. Thereby, one of the first coordinate (x1, y1) and the second coordinate (x2, y2) is located at the left side of the straight line ST1, and the other one of the first coordinate (x1, y1) and the second coordinate (x2, y2) is located at the right side of the straight line ST1, so that the color of the first light ray L1 and the color of the modulated color point may be coordinated with each other. In FIG. 3, the shortest distance between the position DP1 and the straight line ST1 is SG1, SG1 is exemplarily as $|W_x-x1|$, the shortest distance between the position DP2 and the straight line ST1 is SG2, SG2 is exemplarily as $|x2-W_x|$, and the following relationships may be satisfied: $|SG2-SG1| \le 0.2$, i.e., $|2W_x-x2-x1| \le 0.2$ or $|x2+x1-2W_x| \le 0.2$; and $0.5 \le |SG1|/|SG2| \le 1.5$, i.e., $0.5 \le |W_x-x1|/|x2-W_x| \le 1.5$. Thereby, the difference between the distance between the first coordinate (x1, y1) and the straight line ST1 and the distance between the second coordinate (x2, y2) and the straight line ST1 is smaller, which can improve the problem of color distortion or can provide a color temperature range that is more comfortable for human eyes.

Figure 4:
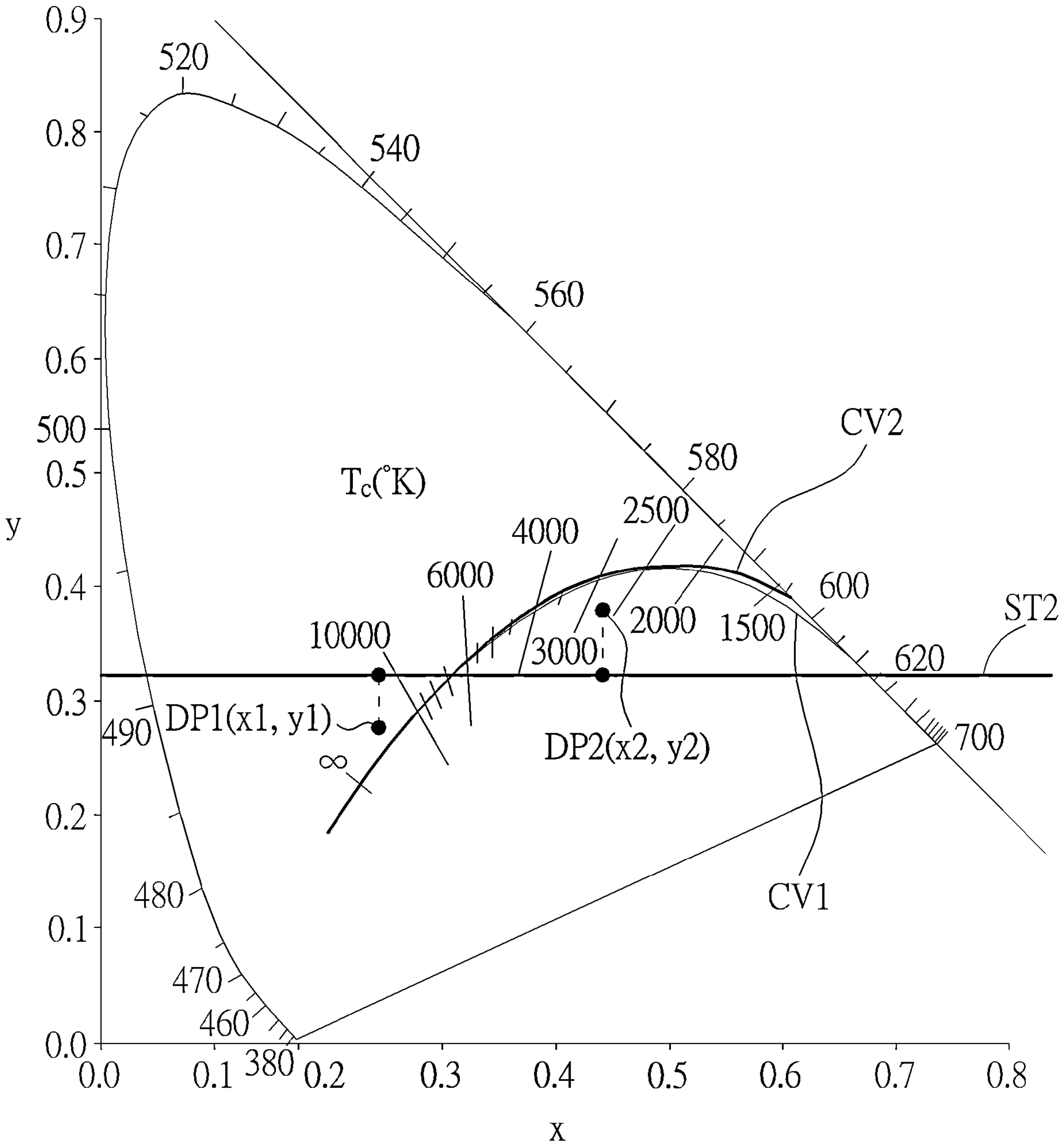
FIG. 4 is a schematic diagram showing positions of a first coordinate and a second coordinate in the chromaticity diagram of the CIE 1931 color space according to further another embodiment of the present disclosure.

Please refer to FIG. 4, which is a schematic diagram showing positions of a first coordinate (x1,y1) and a second coordinate (x2,y2) in the chromaticity diagram of the CIE 1931 color space according to further another embodiment of the present disclosure. The straight line ST2 represents the equation of $y=W_y$, in which the following relationship is satisfied: $0.27 \le W_y \le 0.37$. In FIG. 4, the following relationships are satisfied: $y1<W_y$, and $y2>W_y$, that is, $(W_y-y1)>0$, and $(W_y-y2)<0$, which is exemplary. In other embodiments, the following relationships may be satisfied: $y1>W_y$, $y2<W_y$, that is, $(W_y-y1)<0$, and $(W_y-y2)>0$. Thereby, one of the first coordinate (x1, y1) and the second coordinate (x2, y2) is located above the straight line ST2, and the other one of the first coordinate (x1, y1) and the second coordinate (x2, y2) is located below the straight line ST2, so that the color of the first light ray L1 and the color of the modulated color point of the optical film 20 may be coordinated with each other.

Figure 5:
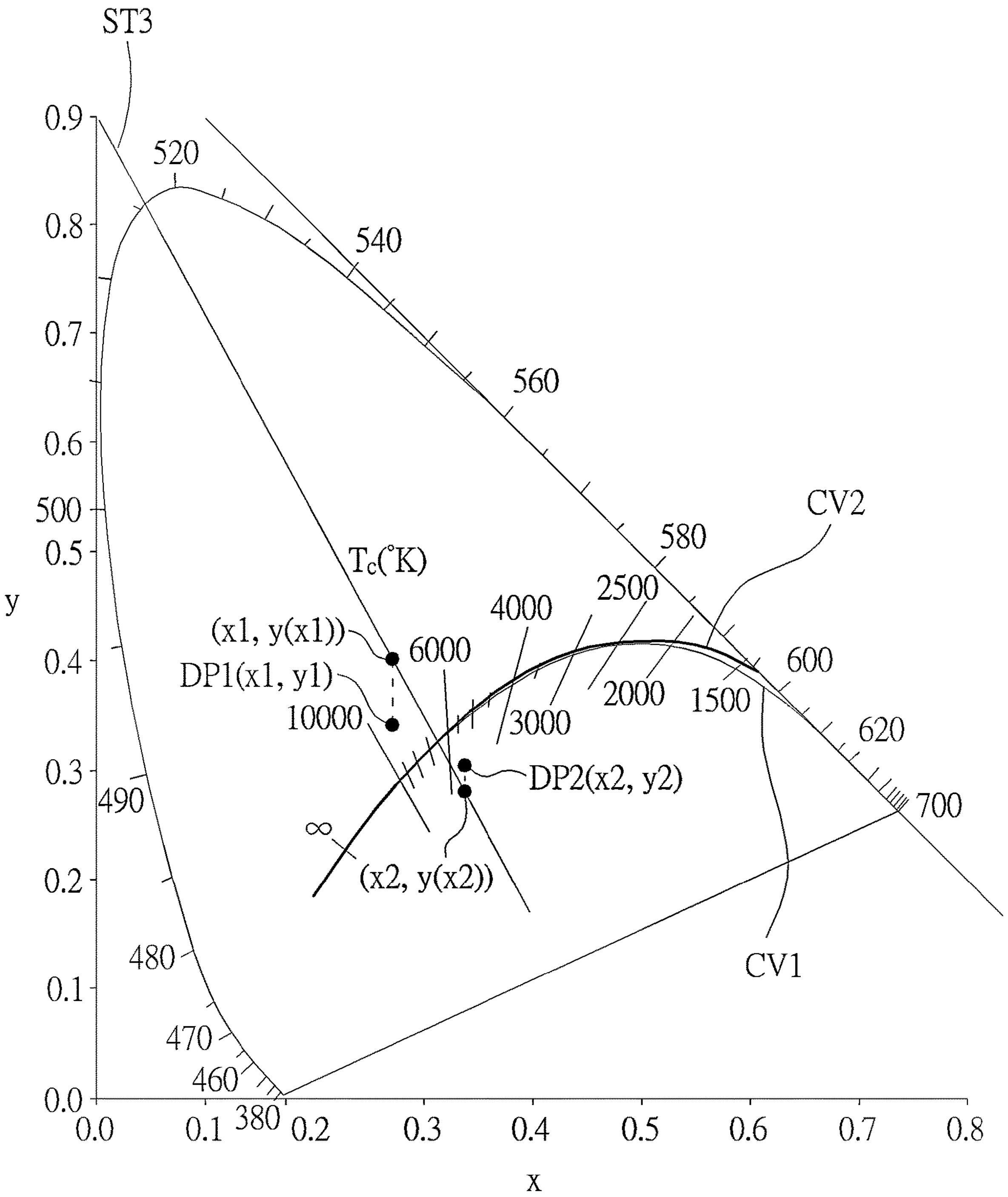
FIG. 5 is a schematic diagram showing positions of a first coordinate and a second coordinate in the chromaticity diagram of the CIE 1931 color space according to yet another embodiment of the present disclosure.

FIG. 5 is a schematic diagram showing positions of a first coordinate (x1,y1) and a second coordinate (x2,y2) in the chromaticity diagram of the CIE 1931 color space according to yet another embodiment of the present disclosure. The straight line ST3 represents the equation of $y(x)=-1.824x+0.9$. When the x-coordinate of the straight line ST3 is x1, the y-coordinate is y(x1), and when the x-coordinate of straight line ST3 is x2, the y-coordinate is y(x2). In FIG. 5, the following relationships are satisfied: $y(x1)>y1$, and $y(x2)<y2$, i.e., $(y1-y(x1))<0$, and $(y2-y(x2))>0$, which is exemplary. Moreover, the following relationships are satisfied: $0.25 \le x1 \le 0.35$, $0.27 \le y1 \le 0.37$, $0.25 \le x2 \le 0.35$, and $0.27 \le y2 \le 0.37$. In other embodiment, the following relationships may be satisfied: $y(x1)<y1$, $y(x2)>y2$, i.e., $(y1-y(x1))>0$, and $(y2-y(x2))<0$, and the following relationships are satisfied: $0.25 \le x1 \le 0.35$, $0.27 \le y1 \le 0.37$, $0.25 \le x2 \le 0.35$, and $0.27 \le y2 \le 0.37$. Thereby, one of the first coordinate (x1, y1) and the second coordinate (x2, y2) is located above the straight line ST3, and the other one of the first coordinate (x1, y1) and the second coordinate (x2, y2) is located below the straight line ST3, so that the color of the first light ray L1 and the color of the modulated color point of the optical film 20 may be coordinated with each other.

Figure 6:
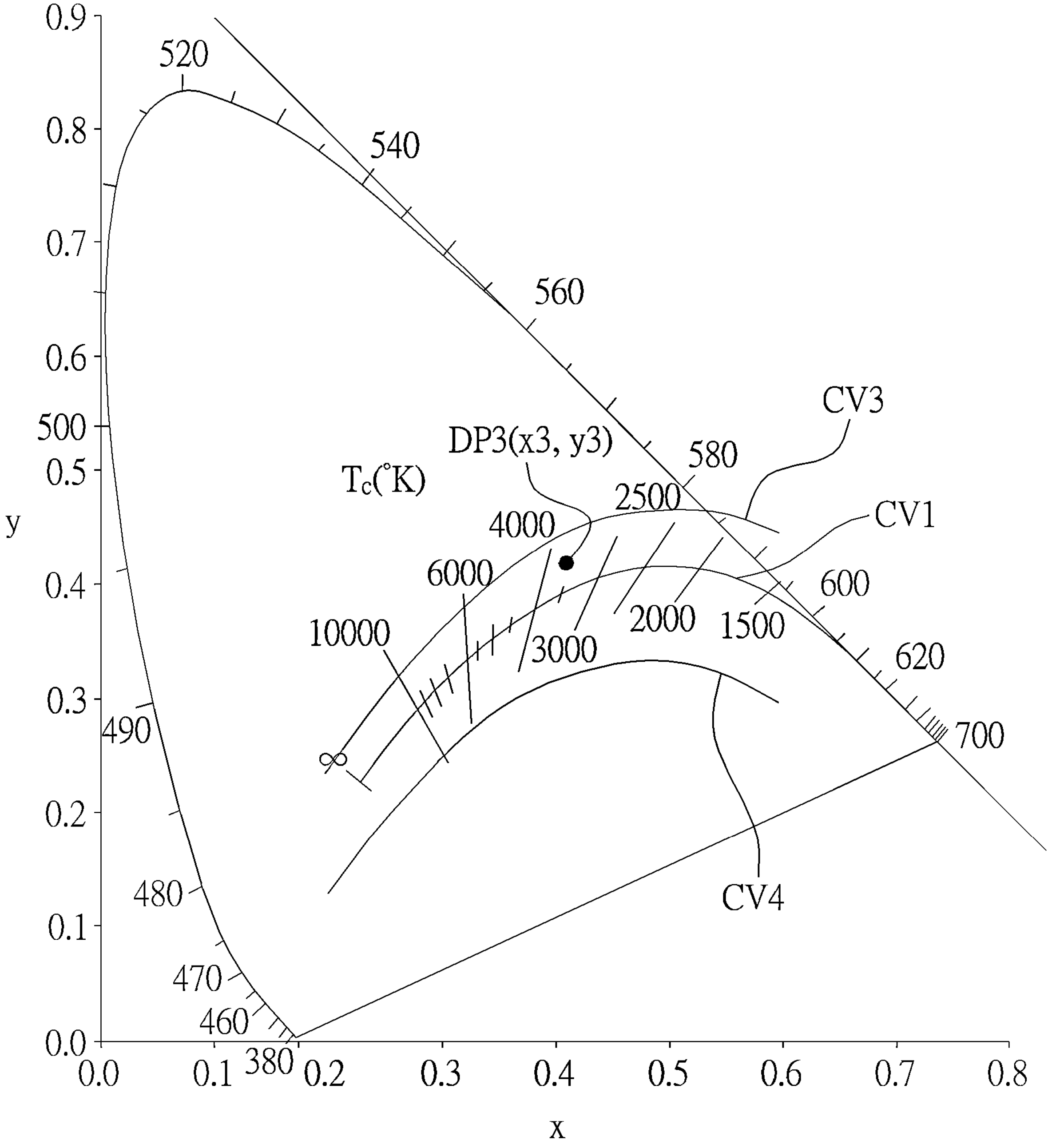
FIG. 6 is a schematic diagram showing a position of a third coordinate in the chromaticity diagram of the CIE 1931 color space according to yet another embodiment of the present disclosure.

Please refer to FIG. 1 and FIG. 6 at the same time. FIG. 6 is a schematic diagram showing a position of a third coordinate (x3, y3) in the chromaticity diagram of the CIE 1931 color space according to yet another embodiment of the present disclosure. A second light ray L2 is emitted after the first light ray L1 passes through the optical film 20. The second light ray L2 has at least one corresponding position DP3 in the CIE 1931 color space. The at least one corresponding position DP3 of the second light ray L2 has a third coordinate (x3, y3) in the CIE 1931 color space corresponding thereto. The curve CV3 represents the equation of $y(x)=-2.48\,x^2+2.52x-0.17$. The curve CV4 represents the equation of $y(x)=-2.62\,x^2+2.52x-0.27$. The third coordinate (x3, y3) is located between the curve CV3 and the curve CV4, and the following relationship is satisfied: $0.2 \le x3 \le 0.5$ or $0.25 \le x3 \le 0.35$. Thereby, the light ray, such as the second light ray L2 in FIG. 1, emitted by the electronic device 1, can meet requirements, such as improving the problem of color distortion or providing a color temperature range that is more comfortable for human eyes.

Figure 7:
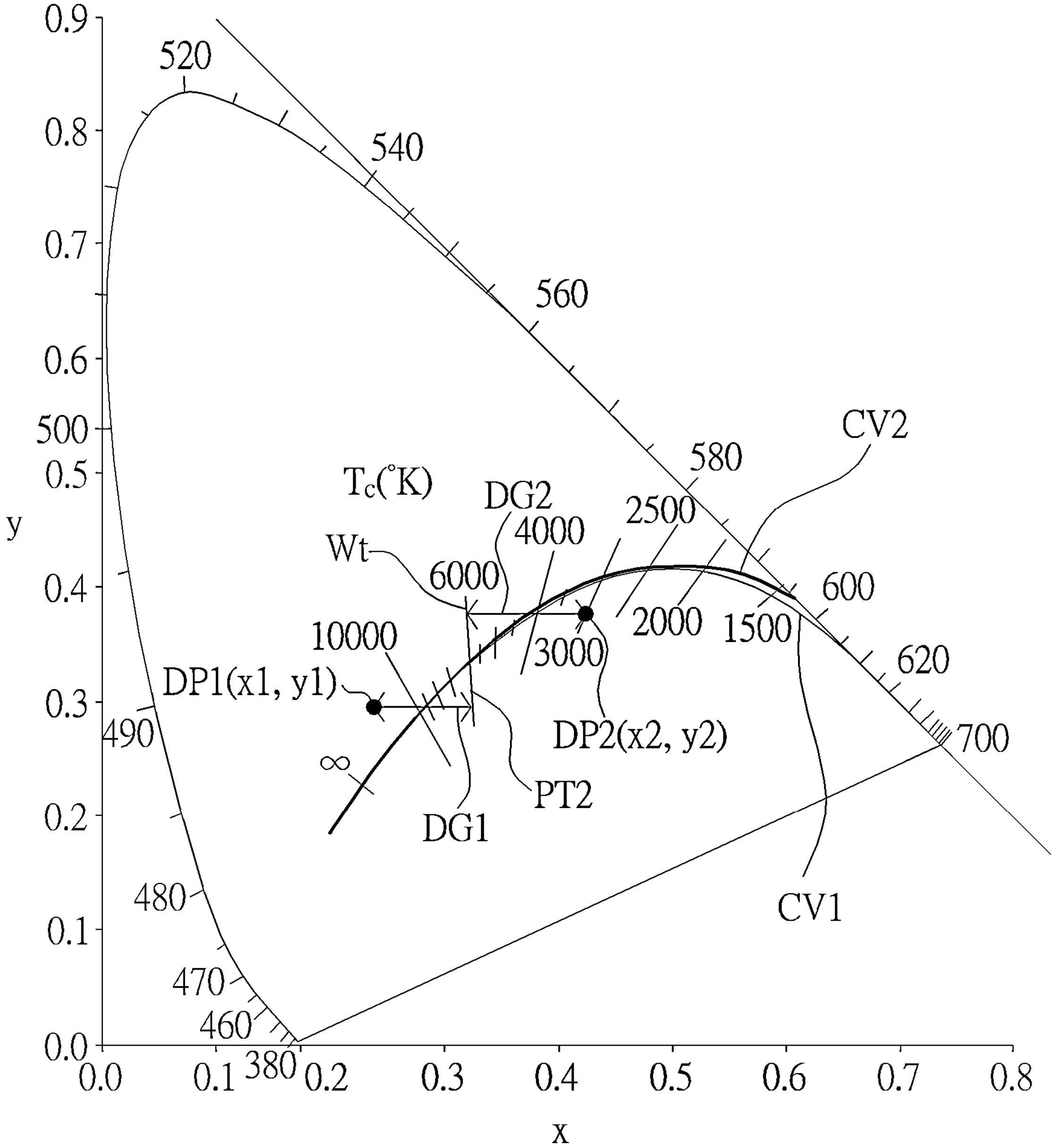
FIG. 7 is a schematic diagram showing positions of a first coordinate and a second coordinate in the chromaticity diagram of the CIE 1931 color space according to yet another embodiment of the present disclosure.

Please refer to FIG. 7, which is a schematic diagram showing positions of a first coordinate (x1,y1) and a second coordinate (x2,y2) in the chromaticity diagram of the CIE 1931 color space according to yet another embodiment of the present disclosure. The straight line PT2 represents the set of points with a color temperature of 6000 K. The first coordinate (x1, y1) corresponds to a first relative color temperature value Wt1 (not labeled), the second coordinate (x2, y2) corresponds to a second relative color temperature value Wt2, and the first relative color temperature value Wt1 and the second relative color temperature value Wt2 may satisfy the following relationship: $0.1 \le Wt1/Wt2 \le 10$. The white point corresponds to a reference relative color temperature value Wt. In FIG. 7, the reference relative color temperature value Wt is exemplarily as 6000 K, but not limited thereto. In some embodiments, the reference relative color temperature value Wt may satisfy the following relationship: $4000\text{ K} \le Wt \le 10000\text{ K}$. In FIG. 7, the first relative color temperature value Wt1 of the first coordinate (x1, y1) is greater than the reference relative color temperature value Wt of the white point, and the second relative color temperature value Wt2 of the second coordinate (x2, y2) is less than the reference relative color temperature value Wt of the white point, i.e., when $(Wt1-Wt)>0$, $(Wt2-Wt)<0$, which is exemplarily. In other embodiment, the first relative color temperature value Wt1 of the first coordinate (x1, y1) may be less than the reference relative color temperature value Wt of the white point, and the second relative color temperature value Wt2 of the second coordinate (x2, y2) may be greater than the reference relative color temperature value Wt of the white point, i.e., when $(Wt1-Wt)<0$, $(Wt2-Wt)>0$. Thereby, one of the first coordinate (x1, y1) and the second coordinate (x2, y2) is located at the left side of the straight line representing the reference relative color temperature value Wt (herein, exemplarily being the straight line PT2 representing the color temperature of 6000 k), and the other one of the first coordinate (x1, y1) and the second coordinate (x2, y2) is located at the right side of the straight line representing the reference relative color temperature value Wt (herein, exemplarily being the straight line PT2 representing the color temperature of 6000 k), so that the color of the first light ray L1 and the color of the modulated color point may be coordinated with each other. In some embodiments, the absolute value of the difference between the first relative color temperature value Wt1 and the reference relative color temperature value Wt of the white point may be less than 6000 K, i.e., $|Wt1-Wt|<6000$ K, and the absolute value of the difference between the second relative color temperature value Wt2 and the reference relative color temperature value Wt of the white point may be less than 6000 K, i.e., $|Wt2-Wt|<6000$K. In some embodiments, the absolute value obtained by subtracting the difference between the first relative color temperature value Wt1 and the reference relative color temperature value Wt of the white point from the difference between the second relative color temperature value Wt2 and the reference relative color temperature value Wt of the white point may be less than or equal to 6000 K, i.e., $|Wt1+Wt2-2Wt|<6000$ K.

In FIG. 7, the shortest distance between the position DP1 and the straight line (herein, exemplarily being the straight line PT2 representing the color temperature of 6000 k) representing the reference relative color temperature value Wt is DG1, the shortest distance between the position DP2 and the straight line (herein, exemplarily being the straight line PT2 representing the color temperature of 6000 k) representing the reference relative color temperature value Wt is DG2, the shortest distance DG1 and the shortest distance DG2 may satisfy the following relationship: $|DG1-DG2|\leq 0.2$. Thereby, the difference between the distance between the first coordinate (x1, y1) and the straight line representing the reference relative color temperature value Wt and the distance between the second coordinate (x2, y2) and the straight line representing the reference relative color temperature value Wt is smaller. The calculation method of the shortest distance from a point to a straight line is well known in the art and is not described herein. In addition, the scale can also be applied to calculate the shortest distance DG1 and the shortest distance DG2 to obtain the difference therebetween.

According to the above description, the present disclosure can adjust the color of the first light ray L1 of the light emitting panel 10 based on the modulated color point of the optical film 20 and the predetermined color of the light ray(such as the color of the aforementioned second light ray L2) emitted by the electronic device 1, or the color of the first light ray L1 of the light emitting panel 10 and the types of the optical film 20 may be adjusted simultaneously based on the predetermined color of the light ray(such as the color of the aforementioned second light ray L2) emitted by the electronic device 1, such that the color of the light ray emitted by the electronic device 1 can meet requirements.

Figure 8A:
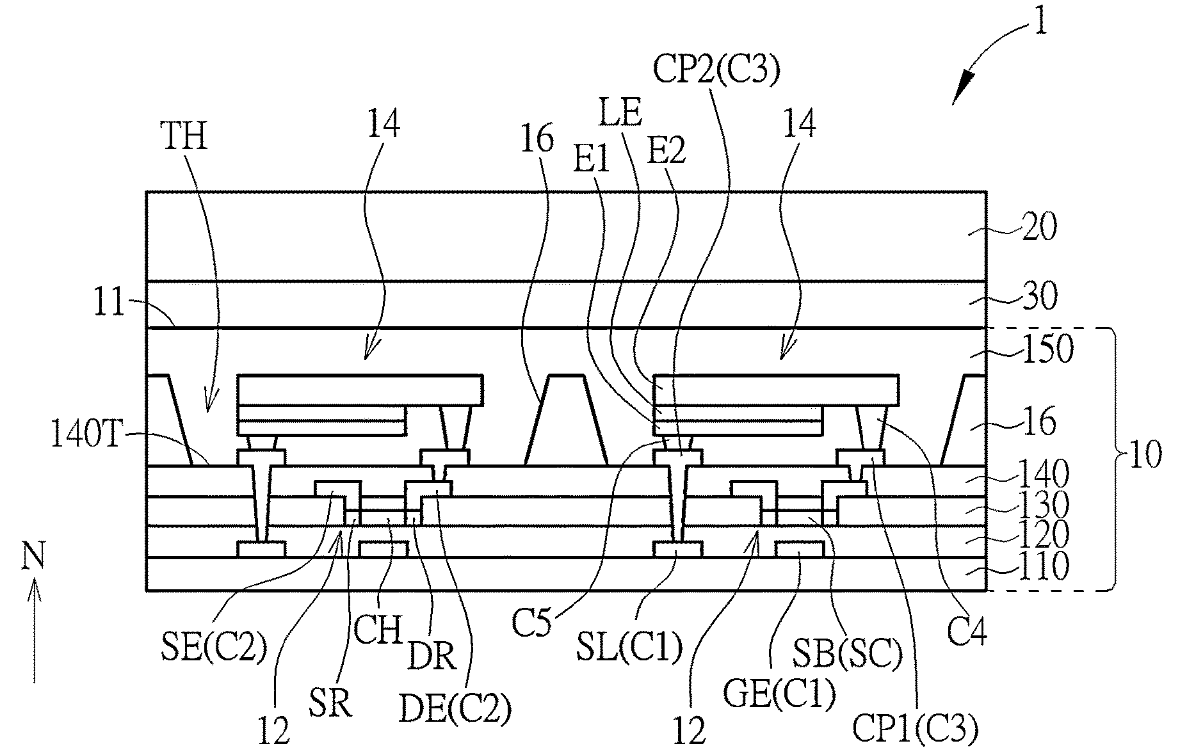
FIG. 8A is a partial cross-sectional schematic diagram of an electronic device according to an embodiment of the present disclosure.

Please refer to FIG. 8A, which is a partial cross-sectional schematic diagram of an electronic device 1 according to an embodiment of the present disclosure. In FIG. 8A, the electronic device 1 includes a light emitting panel 10 and an optical film 20, and may optionally include an adhesive layer 30. The optical film 20 is disposed on the light emitting surface 11 of the light emitting panel 10, and the adhesive layer 30 is disposed between the light emitting panel 10 and the optical film 20. The adhesive layer 30 is configured to connect the optical film 20 to the light emitting panel 10, but not limited thereto.

The light emitting panel 10 may include a substrate 110, a conductive layer C1, an insulating layer 120, a semiconductor layer SC, an insulating layer 130, a conductive layer C2, an insulating layer 140, a conductive layer C3, a conductive structure C4, a conductive structure C5, a light emitting unit 14 and an insulating layer 150, but not limited thereto.

The substrate 110 may be a rigid substrate or a flexible substrate. A material of the substrate may include, for example, glass, ceramic, sapphire, plastic or other suitable substrate materials. In some embodiments, the substrate 110 may be a single-layer or multi-layer structure. For example, when the substrate 100 is a multi-layer structure, the substrate 110 may include at least one inorganic layer (not shown) and at least one organic layer (not shown) stacked alternatively. The organic layer may include, for example, polyimide (PI), polyethylene terephthalate (PET), adhesive or other suitable materials. The inorganic layer may include, for example, silicon oxide (SiOx), silicon nitride (SiNx) or other suitable material, and the present disclosure is not limited thereto.

The conductive layer C1 is disposed on the substrate 110. The conductive layer C1 includes a plurality of gate electrodes GE and signal lines SL. The insulating layer 120 is disposed on the conductive layer C1, and the semiconductor layer SC is disposed on the insulating layer 120. The semiconductor layer SC includes a plurality of semiconductor blocks SB. Two end portions of one of the semiconductor blocks SB may be doped with dopant to respectively serve as a drain region DR and a source region SR, and the semiconductor blocks SB may include a channel region CH located between the drain region DR and the source region SR. A gate electrode GE and a semiconductor block SB may form a transistor. The transistor may serve as a switch element 12. The transistor may include, for example, a thin film transistor formed by a thin film process or a metal oxide semiconductor field effect transistor (MOSFET) formed by a semiconductor process. The material of the semiconductor layer SC may include, for example, silicon or metal oxide, such as low temperature poly-silicon (LTPS) or amorphous silicon (a-Si), indium gallium zinc oxide (IGZO) or other suitable semiconductors, but not limited thereto. In some embodiments, the semiconductor blocks SB of different transistors may include different materials. For example, the semiconductor block SB of one of the transistors may include LTPS, and the semiconductor block SB of another one of the transistors may include metal oxide, but not limited thereto.

The insulating layer 130 is disposed on the semiconductor layer SC, and the conductive layer C2 is disposed on the insulating layer 130. The conductive layer C2 includes a plurality of drain electrodes DE and a plurality of source electrodes SE. The insulating layer 130 is formed with a plurality of through holes (not labeled) to expose the drain region DR and the source region SR of the semiconductor block SB, the drain electrode DE may be electrically connected with the drain region DR through the through hole of the insulating layer 130, and the source electrode SE may be connected with the source region SR through the through hole of the insulating layer 130.

The insulating layer 140 is disposed on the conductive layer C2, and the conductive layer C3, the conductive structure C4 and the light emitting unit 14 are disposed on the insulating layer 140. The insulating layer 150 is disposed on the conductive layer C3, the conductive structure C4 and the light emitting unit 14. The conductive layer C3 includes a plurality of conductive pads CP1 and a plurality of conductive pads CP2. A plurality of through holes (not labeled) are formed in the insulating layer 140 to expose the drain electrodes DE, so that the conductive pads CP1 may be electrically connected with the drain electrodes DE through the through holes. A plurality of through holes (not labeled) are formed in the insulating layer 140, the insulating layer 130 and the insulating layer 120 to expose the signal lines SL, so that the conductive pads CP2 may be electrically connected with the signal lines SL through the through holes.

The number of the light emitting units 14 is exemplarily plural. The light emitting units 14 may be dies or chips, and may include diodes, such as organic light emitting diodes or inorganic light emitting diodes. In FIG. 8A, the light emitting units 14 are exemplarily inorganic light emitting diodes, and each of the light emitting units 14 may include an electrode E1, a light emitting layer LE, an electrode E2 stacked in sequence, and a conductive structure C4 and a conductive structure C5. The conductive structure C4 and the conductive structure C5 of each of the light emitting units 14 may be electrically connected with the conductive pad CP1 and the conductive pad CP2, respectively. In one embodiment, the light emitting units 14 may be configured to generate light rays of different colors. In another embodiment, the light emitting units 14 may be configured as sub-pixels of different colors, so that the electronic device 1 may serve as a display device to display color images. The light emitting units 14 may be configured to generate blue light ray, red light ray and green light ray, respectively, but not limited thereto. In some embodiments, the light emitting units 14 may generate light rays of the same color, but not limited thereto.

In one embodiment, the electronic device 1 may further include a shielding layer 16. The shielding layer 16 may be disposed on the insulating layer 140 and have a plurality of openings TH. The openings TH may expose the conductive pads CP1, the conductive pads CP2 and part of the upper surface 140T of the insulating layer 140. One of the light emitting units 14 may be disposed in an opening TH. Therefore, part of the shielding layer 16 may be disposed between two adjacent light emitting units 14. The shielding layer 16 may be configured to provide an effect of shielding electromagnetic signals, for example, to prevent light rays of different light emitting units 14 from interfering with each other. The material of the shielding layer 16 may include, for example, absorbing materials or reflective materials. The absorbing materials may include, for example, black or gray ink, black or gray photoresist, other suitable materials, or a combination thereof. The reflective materials may include, for example, white reflective materials, metallic reflective materials, other suitable materials, or a combination thereof.

The insulating layer 150 is disposed on the shielding layer 16 and the light emitting units 14, and may be filled in the openings TH of the shielding layer 16. The light emitting units 14 may be electrically connected with the switch elements 12 and the signal lines SL, in which the switch elements 12 may be configured to switch on/off the light emitting units 14, and the signal lines SL may transmit signals to the light emitting units 14, such that the light emitting units 14 generate corresponding outputs. In FIG. 8A, the number of the switch elements 12 and signal lines SL are exemplarily plural, and the switching elements 12 and the signal lines SL may be electrically connected with the light emitting units 14 in a one-to-one correspondence, but not limited thereto. The number of the switch elements 12 and the signal lines SL corresponding to the light emitting unit 14 may also be adjusted according to requirements.

The materials of the conductive layer C1, the conductive layer C2, the conductive layer C3, the conductive structure C4 and the conductive structure C5, for example, may independently include a metal material, in which the metal material may include, for example, aluminum, molybdenum, copper, titanium, other suitable materials, or a combination thereof, but not limited thereto.

The materials of the insulating layer 120 and the insulating layer 130 may independently include, for example, silicon oxide, silicon nitride, silicon oxynitride, other suitable inorganic materials, or a combination thereof. The material of the insulating layer 140 may include, for example, organic material, other suitable material, or a combination thereof, such as acrylic, epoxy or resin, but not limited thereto. The insulating layer 150 may serve as an encapsulation layer or a filling layer. The insulating layer 150 is disposed on the light emitting units 14 to block moisture and/or oxygen from the outside, thereby reducing possibility of damage to the light emitting units 14 due to moisture and/or oxygen. The material of the insulating layer 150 may include, for example, transparent material, such as transparent resin, silicone or other suitable material.

The optical film 20 may be a single-layer structure or a multi-layer structure. For example, when the optical film 20 is a multi-layer structure, the optical film 20 may include a substrate layer and a decorative layer, and the decorative layer may be disposed on the substrate layer. For example, the decorative layer may be a film layer attached to the outer surface of the substrate layer, or the decorative layer may be an ink layer formed on the outer surface of the substrate layer by inkjet, print, or other methods. The substrate layer may include a base material. When the optical film 20 is a single-layer structure, the optical film 20 may include a base material and a doping material, in which the doping material may be randomly dispersed in the base material. The base material may be, for example, a resin material or a glass material. The resin material may include, for example, polyethylene naphthalate (PEN), polyether sulphone (PES), polyethylene terephthalate (PET), polycarbonate (PC), poly (methyl methacrylate) (PMMA), polyimide (PI), polyvinyl alcohol (PVA), polyvinyl chloride (PVC), polydimethylsiloxane (PDMS), triacetate cellulose film (TAC) or other suitable materials. The doping material may include, for example, a toning element, such as a dye, a pigment, or a colored glass powder, and the particle size of the doping material may, for example, range from 0.05 micrometer (μm) to 1 millimeter (mm). The thickness of the optical film 20 may be, for example, less than 5 mm, or may range from 5 μm to 30 μm. The material of the adhesive layer 30 may be an optical clear resin (OCR), optical clear adhesive (OCA), or other materials that may be used for bonding, but not limited thereto.

Figure 8B:
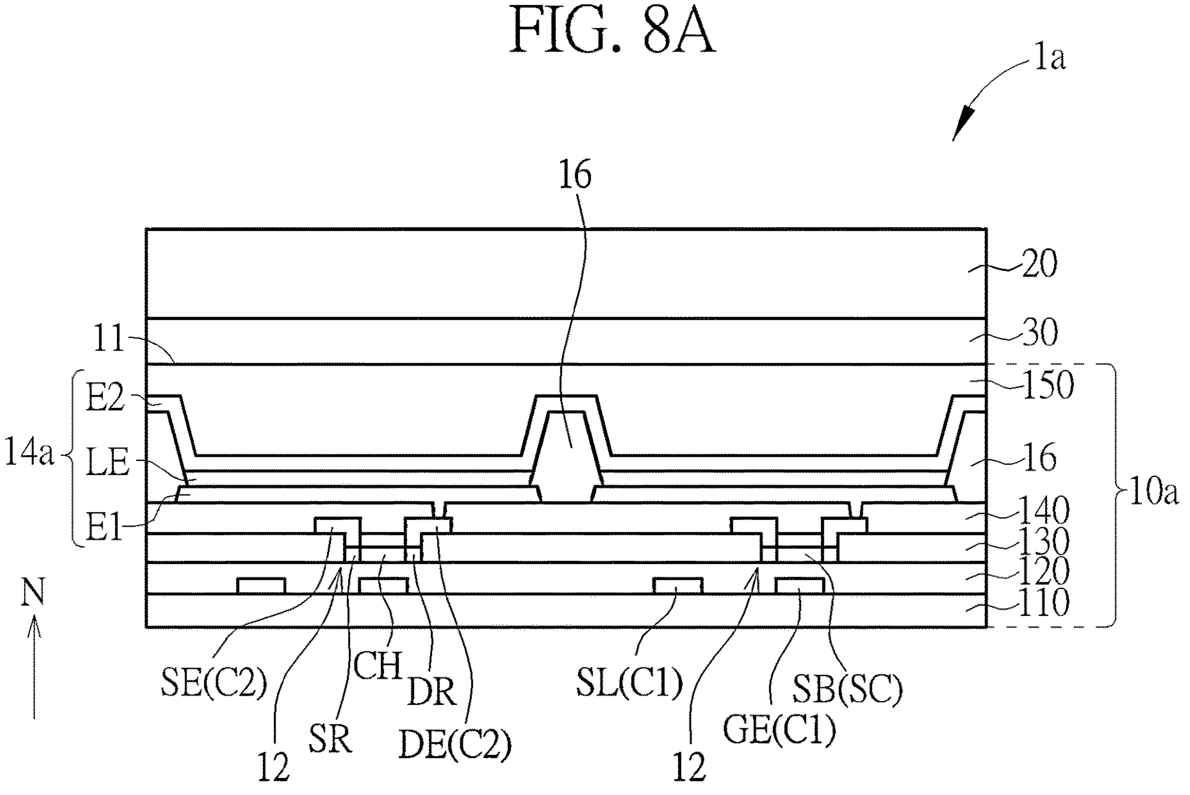
FIG. 8B is a partial cross-sectional schematic diagram of an electronic device according to another embodiment of the present disclosure.

Please refer to FIG. 8B, which is a partial cross-sectional schematic diagram of an electronic device 1*a* according to another embodiment of the present disclosure. In FIG. 8B, the electronic device 1*a* includes a light emitting panel 10*a*, an optical film 20, and may optionally include an adhesive layer 30. The main difference between the electronic device 1*a* and the electronic device 1 is that the light emitting units 14*a* in the light emitting panel 10*a* are different from the light emitting units 14 in the light emitting panel 10. In the light emitting panel 10*a*, the conductive layer C3, the conductive structure C4 and the conductive structure C5 are omitted. In FIG. 8B, the light emitting units 14*a* are exemplarily organic light emitting diodes, and each of the light emitting units 14*a* may include an electrode E1, a light emitting layer LE and an electrode E2 stacked in sequence, in which multiple light emitting units 14*a* share the electrode E2. In addition, in the view angle of FIG. 8B, the signal lines SL are not electrically connected with the light emitting units 14*a*. However, the signal lines SL are electrically connected with the light emitting units 14*a* at other positions (not shown).

The structures of the light emitting panel 10 and the light emitting panel 10*a* are not limited to the aforementioned structures. The number and layout structure of the insulating layers, the conductive layers and the semiconductor layers may be adjusted according to requirements, and may optionally further include other active elements, passive elements, wires or other suitable circuit elements. The structures of the light emitting panel 10 shown in FIG. 8A and the light emitting panel 10*a* shown in FIG. 8B are exemplary, and the present disclosure is not limited thereto.

Figure 9:
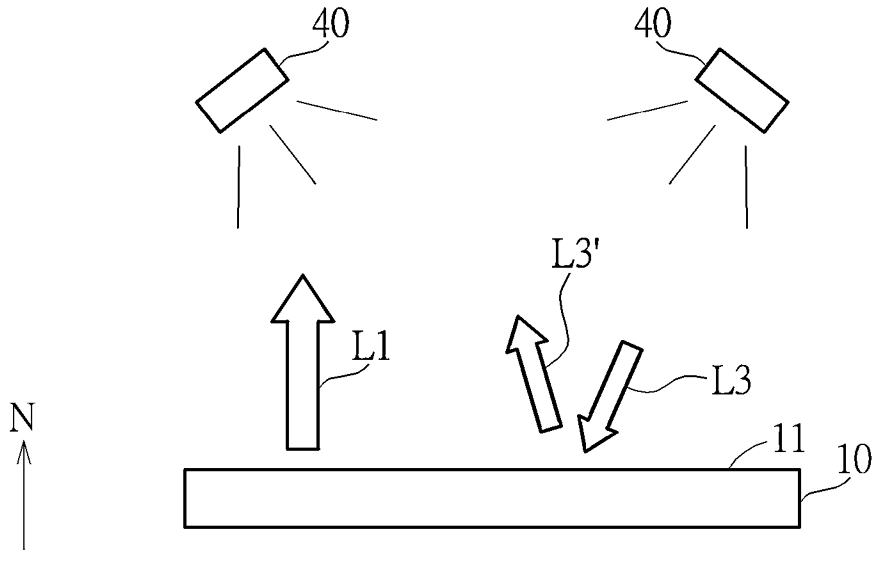
FIG. 9 is a schematic diagram showing a first light ray of an electronic device according to an embodiment of the present disclosure and an ambient light ray of an ambient light source.

Please refer to FIG. 9, which is a schematic diagram showing a first light ray L1 of the light emitting panel 10 according to an embodiment of the present disclosure and an ambient light ray L3 of an ambient light source 40. For details of the light emitting panel 10, reference may be made to the above description and are not repeated herein. The ambient light source 40 may be a light source in the environmental space where the light emitting panel 10 is located. For example, the light emitting panel 10 may be applied in a mobile vehicle. For example, when the light emitting panel 10 is applied to a vehicle display device, the aforementioned environmental space is the environment or space inside the vehicle. In this case, the ambient light source 40 may be an atmosphere light inside the vehicle or may be an ambient light source, such as sunlight, street lights or other light sources, outside the vehicle window and illuminating the environment or space inside the vehicle. The ambient light source 40 may emit an ambient light ray L3. The ambient light ray L3 is reflected by the light emitting surface 11 of the light emitting panel 10 and then superimposed with the first light ray L1 to form an emitting light ray L3'. In other words, the first light ray L1 of the light emitting panel 10 is superimposed with the ambient light ray L3 to form the emitting light ray L3', and the color of the emitting light ray L3' is different from the color of the first light ray L1. In the embodiment, the emitting light ray L3' is the light ray obtained by superposing the first light ray L1 of the light emitting panel 10 and the ambient light ray L3. In another embodiment, the light emitting panel 10 may also be disposed with the optical film as shown in FIG. 1 (not shown), but not limited thereto.

Figure 10A:
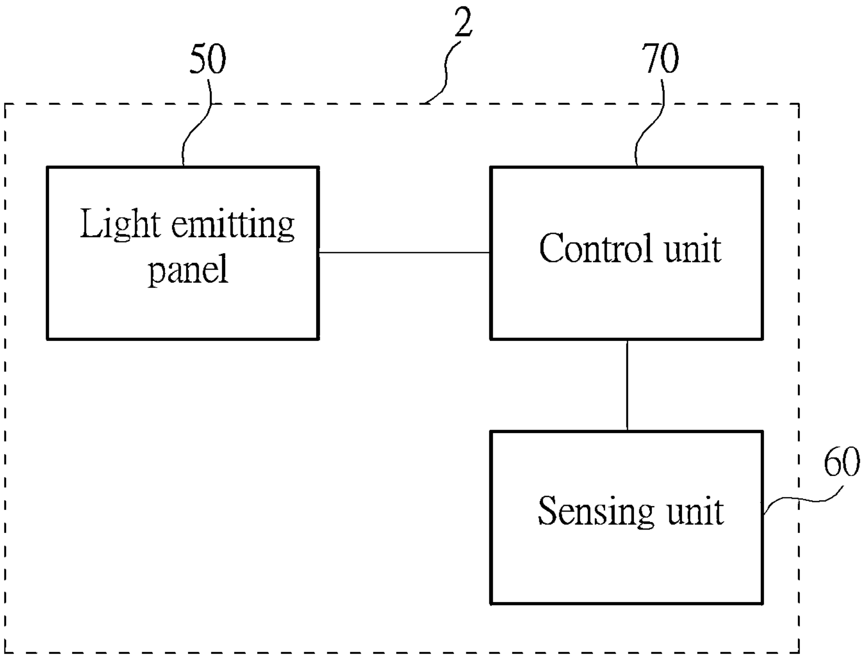
FIG. 10A is a functional block diagram of a light control system according to an embodiment of the present disclosure.
Figure 10B:
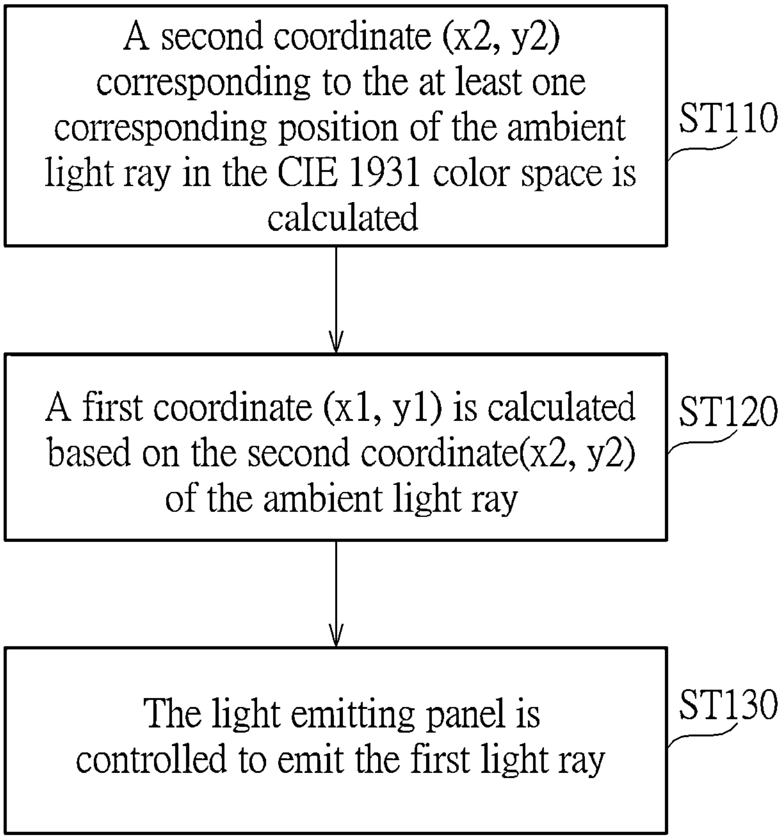
FIG. 10B is a flow chart of a control method of a control unit in FIG. 10A.

Please refer to FIG. 10A, which is a functional block diagram of a light control system 2 according to an embodiment of the present disclosure. The light control system 2 includes a light emitting panel 50, a sensing unit 60 and a control unit 70. Details of the light emitting panel 50 may be the same as the aforementioned light emitting panel 10 or the aforementioned light emitting panel 10*a*, and are not repeated herein. The light emitting panel 50 may be configured for emitting a first light ray(such as the first light ray L1 in FIG. 9). The sensing unit 60 is for sensing an ambient light ray in the environment (such as ambient light ray L3 in FIG. 9). The ambient light ray has at least one corresponding position in the CIE 1931 color space. The at least one corresponding position of the ambient light ray has a second coordinate (x2, y2) in the CIE 1931 color space corresponding thereto. The control unit 70 is electrically connected with the light emitting panel 50 and the sensing unit 60. Please refer to FIG. 10B at the same time, which is a flow chart of a control method of the control unit 70 in FIG. 10A and includes Step ST110, Step ST120 and Step ST130. In Step ST110, a second coordinate (x2, y2) corresponding to the at least one corresponding position of the ambient light ray in the CIE 1931 color space is calculated. In Step ST120, a first coordinate (x1, y1) is calculated based on the second coordinate(x2, y2) of the ambient light ray. The first coordinate (x1, y1) and the second coordinate (x2, y2) satisfy following relationships relative to an equation of $y(x)=-2.48x^2+2.52x-0.22$: when $(y1-y(x1))>0$, $(y2-y(x2))<0$, or when $(y1-y(x1))<0$, $(y2-y(x2))>0$. In Step ST130, the light emitting panel 50 is controlled to emit the first light ray. The first light ray has at least one corresponding position in the CIE 1931 color space, and the at least one corresponding position of the first light ray corresponds to the first coordinate (x1,y1) in the CIE 1931 color space. The difference between the embodiment of FIG. 10A and FIG. 10B and the embodiments in FIG. 1 to FIG. 7 is that the sources of the second coordinates (x2, y2) are different. In each of FIG. 2 to FIG. 7, the second coordinate (x2, y2) is the corresponding coordinate of the at least one corresponding position DP2 of the modulated color point of the optical film 20 in the CIE 1931 color space. In the embodiment, the second coordinate (x2, y2) is the corresponding coordinate of the at least one corresponding position of the ambient light ray in the CIE 1931 color space. Both the modulated color point of the optical film 20 and the ambient light ray may be used to adjust the first light ray. Therefore, the details of the second coordinate (x2, y2) and the first coordinate (x1, y1) of each of FIG. 1 to FIG. 7 may also be applied to the embodiment as long as no inconsistent exists, and are not repeated herein.

In the embodiment, the light emitting panel 50 may include at least one light emitting unit, such as the aforementioned light emitting unit 14 or the light emitting unit 14*a*, but not limited thereto. In another embodiment, an optical film may be further disposed on the light emitting panel 50. The optical film may be, for example, the aforementioned optical film 20. The optical film may be disposed on at least one of the light emitting units and overlap at least one of the light emitting units. In this case, the second light ray L2 in FIG. 1 may be regarded as the first light ray L1 in FIG. 9. The sensing unit 60 may be a light sensor. The control unit 70 may be a central processing unit of the electronic device. In this case, the light emitting panel 50 and the control unit 70 may be elements of the same electronic device. In some embodiments, the environment where the light emitting panel 50 is disposed is a space within a vehicle, then the control unit 70 may include a control center of the vehicle, or the control unit 70 may include the control center of the vehicle and the central processing unit of the electronic device.

In the present disclosure, the first light ray, the second light ray, the modulated color point of the optical film, and the ambient light ray may be measured by a color analyzer. For example, a KONICA MINOLTA CA310 color analyzer may be used to analyze the coordinate of the light ray in the color space, but the present disclosure is not limited thereto.

Compared with the prior art, the electronic device of the present disclosure includes a light emitting panel and an optical film. The present disclosure can adjust the color of the first light ray of the light emitting panel based on the modulated color point of the optical film and the predetermined color of the light ray emitted by the electronic device, or the color of the first light ray of the light emitting panel and the types of the optical film may be adjusted simultaneously based on the predetermined color of the light ray emitted by the electronic device, such that the color of the light ray emitted by the electronic device can meet requirements. The present disclosure further provides a light control system, which may be configured to dynamically adjust the color of the light ray emitted by the light emitting panel according to the ambient light source, so that the color displayed by the light emitting panel after being combined with the ambient light ray can meet requirements.

Those skilled in the art will readily observe that numerous modifications and alterations of the device and method may be made while retaining the teachings of the disclosure.

Accordingly, the above disclosure should be construed as limited only by the metes and bounds of the appended claims.

What is claimed is:

1. An electronic device, comprising:

a light emitting panel for emitting a first light ray, wherein the first light ray has at least one corresponding position in a CIE 1931 color space; and an optical film disposed on the light emitting panel, wherein a modulated color point of the optical film has at least one corresponding position in the CIE 1931 color space;

wherein in the CIE 1931 color space, the at least one corresponding position of the first light ray has a first coordinate (x1, y1) corresponding thereto, the at least one corresponding position of the modulated color point has a second coordinate (x2, y2) corresponding thereto, and the first coordinate (x1, y1) and the second coordinate (x2, y2) satisfy following relationships with respect to an equation of $y(x)=-2.48x^2+2.52x-0.22$:

when $(y1-y(x1))>0$, $(y2-y(x2))<0$, or when $(y1-y(x1))<0$, $(y2-y(x2))>0$;

$0.1 \le x1 \le 0.6$; and $0.1 \le x2 \le 0.6$, wherein the first coordinate (x1, y1) and the second coordinate (x2, y2) are located on opposite sides of the equation in the CIE 1931 color space.

2. The electronic device of claim 1, wherein the first coordinate (x1, y1) and the second coordinate (x2, y2) satisfy following relationships with respect to an equation of $x=W_x$:

when $(W_x-x1)>0$, $(W_x-x2)<0$, or when $(W_x-x1)<0$, $(W_x-x2)>0$; and $0.25 \le W_x \le 0.35$.

3. The electronic device of claim 2, wherein the first coordinate (x1, y1) and the second coordinate (x2, y2) satisfy a following relationship with respect to the equation of $x=W_x$:

$|x2+x1-2W_x| \le 0.2$.

4. The electronic device of claim 2, wherein the first coordinate (x1, y1) and the second coordinate (x2, y2) satisfy a following relationship with respect to the equation of $x=W_x$:

$0.5 \le |W_x-x1|/|x2-W_x| \le 1.5$.

5. The electronic device of claim 1, wherein the first coordinate (x1, y1) and the second coordinate (x2, y2) satisfy following relationships with respect to an equation of $y=W_y$:

when $(W_y-y1)>0$, $(W_y-y2)<0$, or when $(W_y-y1)<0$, $(W_y-y2)>0$; and $0.27 \le W_y \le 0.37$.

6. The electronic device of claim 1, wherein the first coordinate (x1, y1) and the second coordinate (x2, y2) satisfy following relationships with respect to an equation of $y(x)=-1.824x+0.9$:

when $(y1-y(x1))>0$, $(y2-y(x2))<0$, or when $(y1-y(x1))<0$, $(y2-y(x2))>0$;

$0.25 \le x1 \le 0.35$, $0.27 \le y1 \le 0.37$; and $0.25 \le x2 \le 0.35$, $0.27 \le y2 \le 0.37$.

7. The electronic device of claim 1, wherein a second light ray is emitted after the first light ray passes through the optical film, the second light ray has at least one corresponding position in the CIE 1931 color space, the at least one corresponding position of the second light ray has a third coordinate (x3, y3) in the CIE 1931 color space corresponding thereto, and the third coordinate (x3, y3) is located between an equation of $y(x)=-2.62$ x2+2.52x−0.27 and an equation of $y(x)=-2.48x^2+2.52x-0.17$ and satisfies a following relationship:

$0.2 \le x3 \le 0.5$.

8. The electronic device of claim 7, wherein the third coordinate (x3, y3) satisfies a following relationship: $0.25 \le x3 \le 0.35$.

9. The electronic device of claim 1, wherein the first coordinate (x1, y1) corresponds to a first relative color temperature value Wt1, the second coordinate (x2, y2) corresponds to a second relative color temperature value Wt2, the first relative color temperature value Wt1 and the second relative color temperature value Wt2 satisfy a following relationship:

$0.1 \le Wt1/Wt2 \le 10$.

10. The electronic device of claim 1, wherein the first coordinate (x1, y1) corresponds to a first relative color temperature value Wt1, the second coordinate (x2, y2) corresponds to a second relative color temperature value Wt2, a white point corresponds to a reference relative color temperature value Wt, the first relative color temperature value Wt1 and the second relative color temperature value Wt2 satisfy following relationships relative to the reference relative color temperature value Wt:

when $(Wt1-Wt)>0$, $(Wt2-Wt)<0$, or when $(Wt1-Wt)<0$, $(Wt2-Wt)>0$; and

Wt=6000 K.

11. The electronic device of claim 10, wherein the first relative color temperature value Wt1 and the second relative color temperature value Wt2 satisfy a following relationship relative to the reference relative color temperature value Wt:

$|Wt1+Wt2-2Wt| \le 6000$ K.

12. A light control system, comprising:

a light emitting panel;

a sensing unit for sensing an ambient light ray in an environment, wherein the ambient light ray has at least one corresponding position in a CIE 1931 color space; and a control unit electrically connected with the light emitting panel and the sensing unit, wherein the control unit is configured to:

calculate a second coordinate (x2, y2) corresponding to the at least one corresponding position of the ambient light ray in the CIE 1931 color space;

calculate a first coordinate (x1, y1) based on the second coordinate (x2, y2) of the ambient light ray, wherein the first coordinate (x1, y1) and the second coordinate (x2, y2) satisfy following a relative to an equation of $y(x)=-2.48x^2+2.52x-0.22$:

when $(y1-y(x1))>0$, $(y2-y(x2))<0$, or when $(y1-y(x1))<0$, $(y2-y(x2))>0$; and control the light emitting panel to emit a first light ray, wherein the first light ray has at least one corresponding position in the CIE 1931 color space, and the at least one corresponding position of the first light ray corresponds to the first coordinate (x1,y1) in the CIE 1931 color space.

13. The light control system of claim 12, wherein the light emitting panel comprises at least one light emitting unit.

14. The light control system of claim 13, further comprising:

an optical film disposed on the light emitting panel, wherein the optical film overlaps the at least one light emitting unit.

15. The light control system of claim 14, wherein the optical film is a transparent decorative film layer or a translucent decorative film layer.

16. The light control system of claim 12, wherein the environment is a space within a vehicle, and the control unit comprises a control center of the vehicle.

17. The light control system of claim 12, wherein the first coordinate (x1, y1) and the second coordinate (x2, y2) satisfy following relationships with respect to an equation of $x=W_x$:

when $(W_x-x1)>0$, $(W_x-x2)<0$, or when $(W_x-x1)<0$, $(W_x-x2)>0$; and $0.25 \leq W_x \leq 0.35$.

18. The light control system of claim 12, wherein the first coordinate (x1, y1) and the second coordinate (x2, y2) satisfy following relationships with respect to an equation of $y=W_y$:

when $(W_y-y1)>0$, $(W_y-y2)<0$, or when $(W_y-y1)<0$, $(W_y-y2)>0$; and $0.27 \leq W_y \leq 0.37$.

19. The light control system of claim 12, wherein the first coordinate (x1, y1) and the second coordinate (x2, y2) satisfy following relationships with respect to an equation of $y(x)=-1.824x+0.9$:

when $(y1-y(x1))>0$, $(y2-y(x2))<0$, or when $(y1-y(x1))<0$, $(y2-y(x2))>0$;

$0.25 \leq x1 \leq 0.35$, $0.27 \leq y1 \leq 0.37$; and $0.25 \leq x2 \leq 0.35, 0.27 \leq y2 \leq 0.37$.

20. The light control system of claim 12, wherein the first coordinate (x1, y1) corresponds to a first relative color temperature value Wt1, the second coordinate (x2, y2) corresponds to a second relative color temperature value Wt2, the first relative color temperature value Wt1 and the second relative color temperature value Wt2 satisfy a following relationship:

$0.1 \leq Wt1/Wt2 \leq 10$.

* * * * *